Aug. 2, 1932. C. A. WULF 1,869,926
SHEET METAL ELBOW AND METHOD OF PRODUCING
Filed July 5, 1929   2 Sheets-Sheet 1
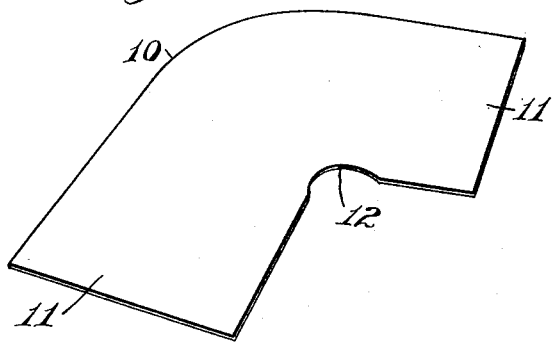
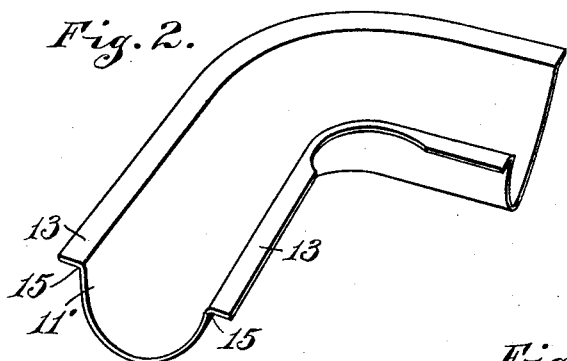
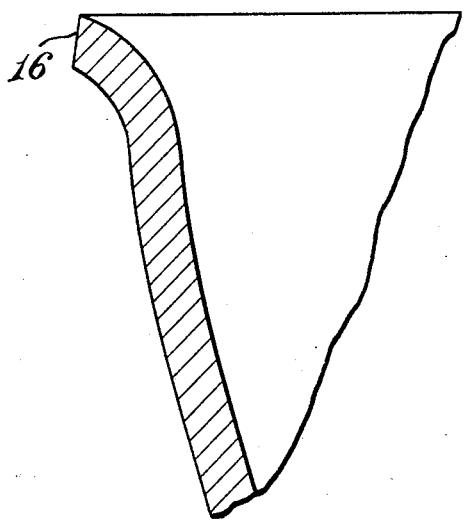
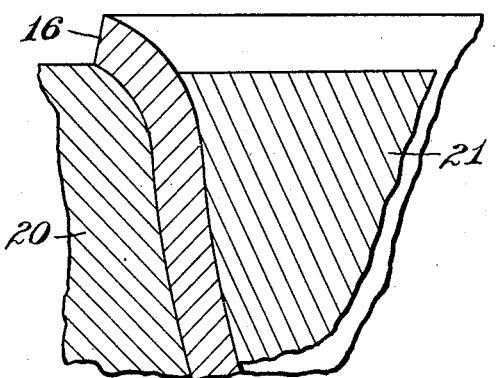
INVENTOR.
Charles A. Wulf,
BY
Hood & Hahn.
ATTORNEYS Aug. 2, 1932.     C. A. WULF     1,869,926
SHEET METAL ELBOW AND METHOD OF PRODUCING
Filed July 5, 1929     2 Sheets-Sheet 2
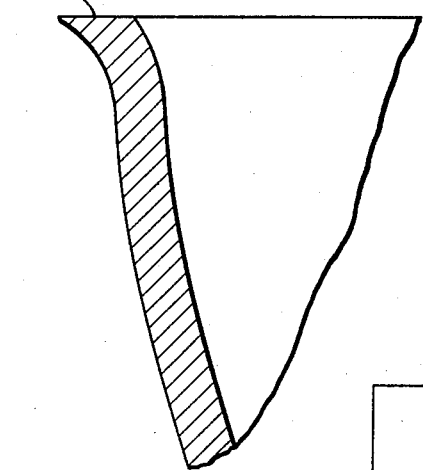
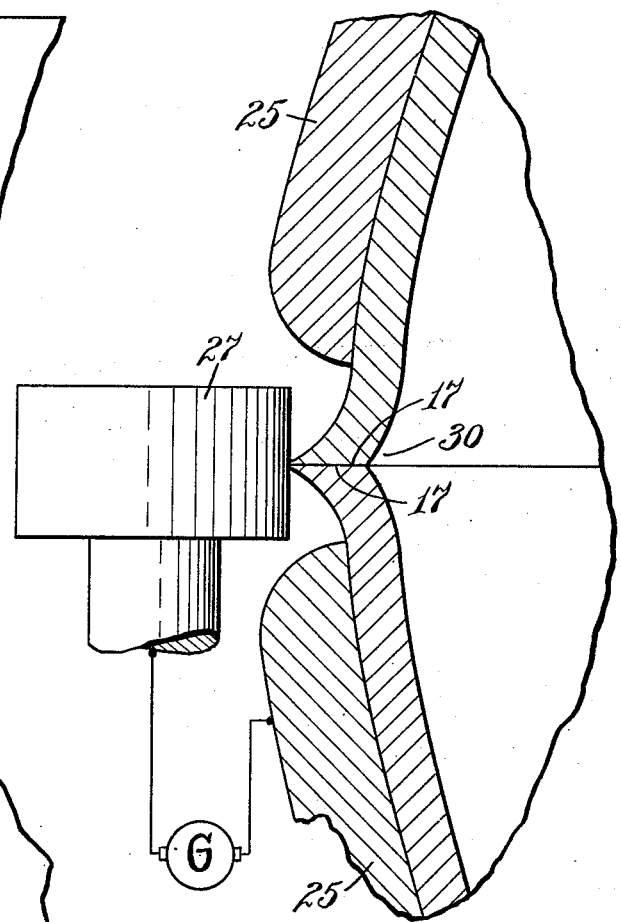
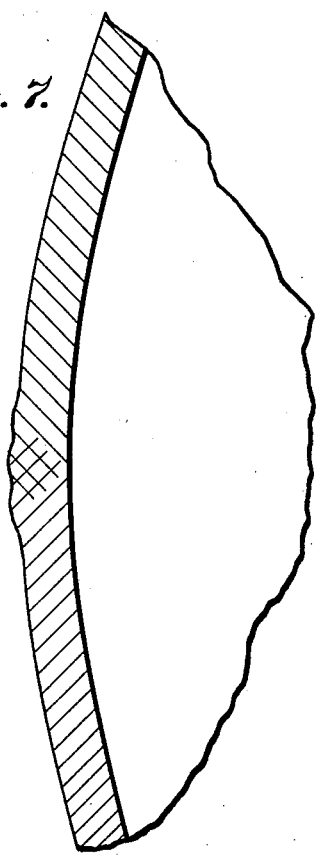
INVENTOR.
Charles A. Wulf,
BY
Hood + Hahn.
ATTORNEYS Patented Aug. 2, 1932

1,869,926

UNITED STATES PATENT OFFICE

CHARLES A. WULF, OF INDIANAPOLIS, INDIANA, ASSIGNOR TO AMERICAN VALVE AND ENAMELING CORPORATION, OF INDIANAPOLIS, INDIANA, A CORPORATION OF INDIANA

SHEET METAL ELBOW AND METHOD OF PRODUCING

Application filed July 5, 1929. Serial No. 375,933.

The object of my invention is to produce an elbow of comparatively thin sheet metal composed of two mating blanks welded together at their mating edges, said mating portions being so preliminarily formed as to be smooth and without wrinkles, both externally and internally and with their mating edges so proportioned and formed that electrical welding, attained by making the mated blanks one terminal and an externally applied pressure roller the other terminal of the welding circuit will result in a smooth interior at the welded junction and an exterior which may be smoothed by comparatively little grinding, the welding operation being accomplished without a mandrel.

The accompanying drawings illustrate my invention.

Fig. 1 is a perspective of the flat blank for one of the mating portions;

Fig. 2 is a perspective of the blank after emergence from the pressing dies;

Fig. 3 is an end elevation on a magnified scale of one end of the pressed blank after the removal of the excess fins;

Fig. 4 is a diagram showing the blank at Fig. 3 in a retaining holder preparatory to grinding;

Fig. 5 is a similar end elevation of the pressed blank after grinding preparatory to mating;

Fig. 6 is an end elevation of two mating pressed and prepared blanks with the pressure roller and electrical circuit indicated diagrammatically;

Fig. 7 is an end elevation, full size, of the welded elbow in its condition preliminary to external grinding and other desired finish.

In the drawings 10 indicates the flat sheet metal blank comprising the two connecting arms 11—11 the axes of which lie at an angle of about 102 degrees to each other. The blank is a comparatively thin sheet and has a width considerably in excess of the amount necessary to complete the half circle and the junction projections to be mentioned. In practice, the metal is 20 gage or thereabouts. This blank at its inner angle is notched out as indicated at 12 for a purpose which will appear. The blank shown in Fig. 1 is laid between male and female dies, in the ordinary manner, the arms of which are at right angles to each other and the male die is enclosed by a pressure pad adapted to cooperate with the flat upper faces of the female die, in a well known manner, to firmly but yieldingly hold the edges of the blank during the pressing operation. This operation is well known, both as to details of die structure and pressure methods and results in the product shown in Fig. 2. Attention is called to the notch 12 appearing in this figure and to the fact that this notch reduces the width of material provided for the laterally extended flange in the crotch of the elbow to a width very materially less than the width of the inner flange, which flanks the arms of the elbow, so that the mass of metal, which must be laterally compressed in the projecting flange and the adjacent curved projections of the elbow at the crotch is materially reduced. By reason of the formation of this notch 12, I have found it possible to produce an elbow having a radius of curvature of the crotch which is very materially less than has heretofore been possible, with blanks of thin metal of ordinary configuration without cracking or wrinkling the inner curve.

With the blank in the form shown in Fig. 2, the lateral flanges 13—13 are joined with the main semi-cylindrical portion 11' by a small radius curve 15 and owing to the spring of the metal are inclined slightly upwardly. I now shear the surplus from the flanges as indicated at 16 in Fig. 3 to leave a projection extending outwardly from the outer surface of the main joint a distance about equal to the gage of the metal. The blank is now clamped in a holder comprising a female member 20 and a male member 21, the depth of this male member being not greater than the internal radius of the completed elbow. The ends of these two holding members project beyond the ends of the elbow section and are clamped together at their projecting ends so as to firmly hold the elbow blank in place and straighten the elbow blank. The projected tips 16 are now subjected to a surface disc grinding operation to form the flat surfaces 17 (Fig. 5) which reduces the extreme edges of the projections practically to a sharp edge.

Two blanks thus prepared are mated as indicated in Fig. 6 and are clamped within or between two female holders 25—25 which form one pole of the welding circuit. The mating edges or projections 17 of the two elbow blanks are then exposed to the pressing action of an electrode 27 which is progressively advanced along said projections. In view of the very small mass of metal of the blank which is to be made plastic by the welding operation, it is quite important that the progressive movement of the electrode 27 along the junction shall be of proper and uniform speed. The preliminary forming of the projections 17, as described above, provides only enough metal to fill the crotch 30 between the two mating blanks, this amount being so small as to chill quickly as it flows into the crotch thereby leaving a smooth interior without the necessity of a backing mandrel. The completely welded element will be slightly rough along the exterior of the welded joint, the surplus being so small, however, that it may be readily removed by an ordinary abrasion belt.

The elbow as thus far produced is an elbow of much shorter radius than has heretofore been producible and, being smooth at the welded joint, both internally and externally, may be readily finished by a fired porcelain enamel so that the completed article is especially attractive and useful as a junction between toilet bowls and supply tanks, enamel of any desired color being used to match the color finish of the bowl or tank. I have found that slight imperfections of continuity of welding will be filled by the fired enamel so that the completed article is water tight, this result being due to the extreme thinness of the elbow and consequent capacity of the enamel to penetrate and fill small openings at the welded joint. In general, however, practice of the method outlined above results in a perfect welding.

I claim as my invention:

1. The method of forming an elbow which consists in the steps of providing a plurality of mating semi-tubulated blanks of thin sheet metal, the diametrical edges of each blank being disposed substantially in a single plane, and each of said edges being joined to the body of the blank by a portion of opposite curvature and shorter radius with respect to the body of the blank, clamping together two such mating blanks, and electrically welding said sections at the mating edges thereof to form a smooth interior at the welded junction without the use of an internal mandrel.

2. In a method of forming short radius elbows of thin sheet metal the steps of forming an L-shaped flat blank with a notch in the interior angle of the blank, and bending said blank into semi-tubular form with a radially projecting flange, said notch being wholly included in said flange.

3. The method of forming short radius elbows of thin sheet metal which comprises the formation of a semi-tubulated blank having laterally extending fins connected to the main body by short radius curves, removing the surplus of said fins to leave a narrow upwardly inclined flange, diametrically surfacing the blank to remove from the inner faces of said upwardly extended flanges material to about the lower outer corner of said flanges, clamping so-prepared semi-tubulated blanks together with their surfaced flange areas mating, and thereupon electrically welding said mating edges during external pressure exerted on the edges of said tubulated blanks.

4. As an article of manufacture, a semi-tubulated blank of thin sheet metal having divergent arms, the edges of said blanks being triangular in cross-section, the upper surfaces of said triangle sections of the two flanges lying in the same plane, and said arms being relieved outwardly adjacent said surfaces.

In witness whereof, I CHARLES A. WULF have hereunto set my hand at Indianapolis, Indiana, this 1st day of July, A. D. one thousand nine hundred and twenty-nine.

CHARLES A. WULF.